April 20, 1954   R. F. WYNN, SR   2,675,947
FEED DISTRIBUTING APPARATUS
Filed June 28, 1948   3 Sheets-Sheet 1
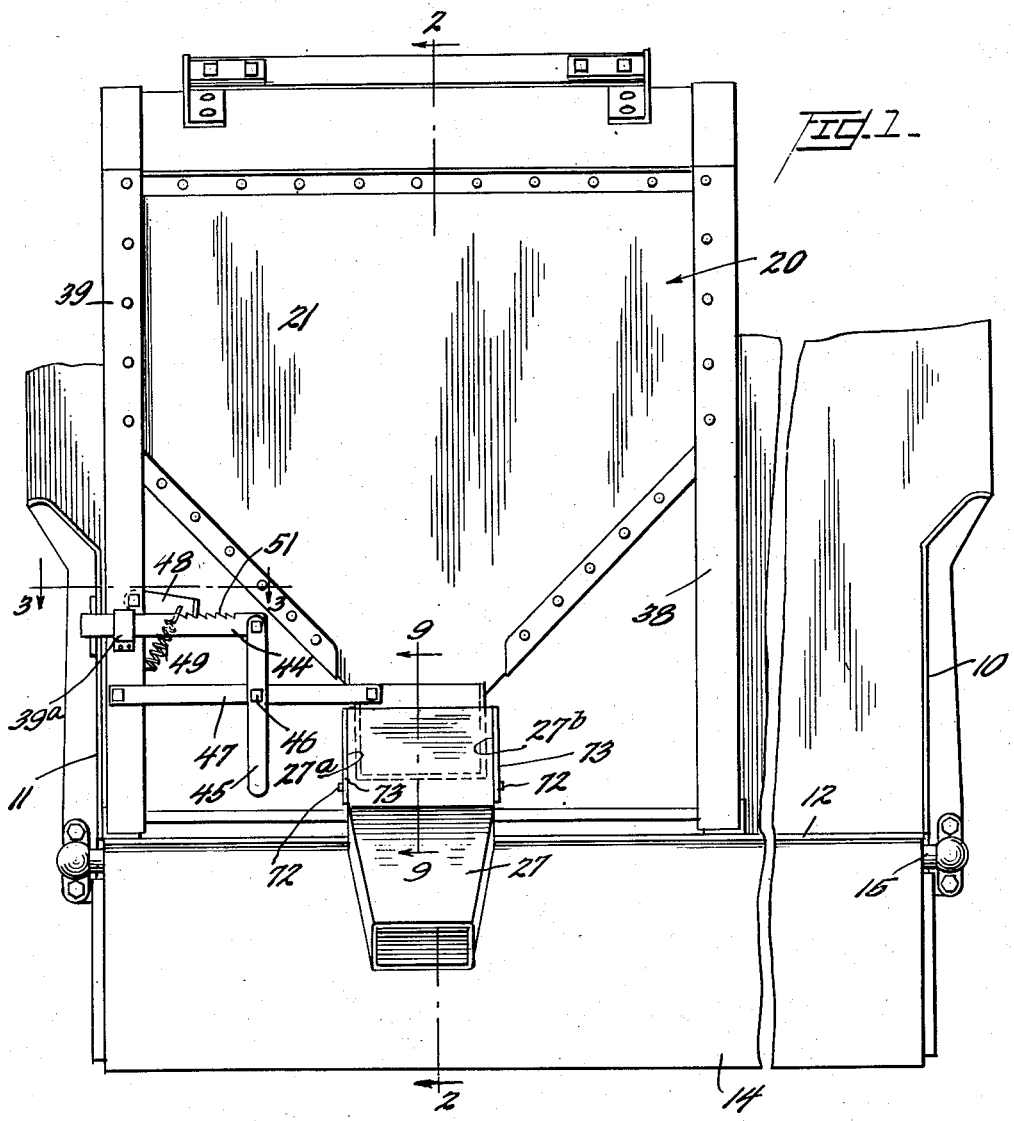
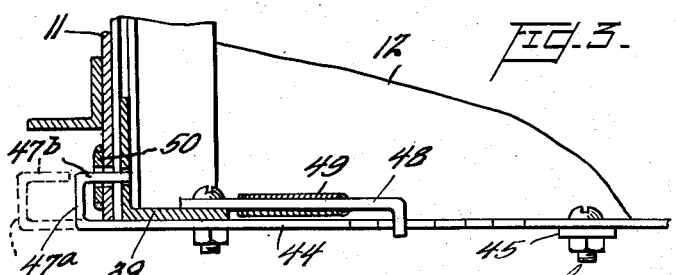
Inventor
R. F. Wynn, Sr.
By Watson, Cole, Grindle & Watson
Attorneys

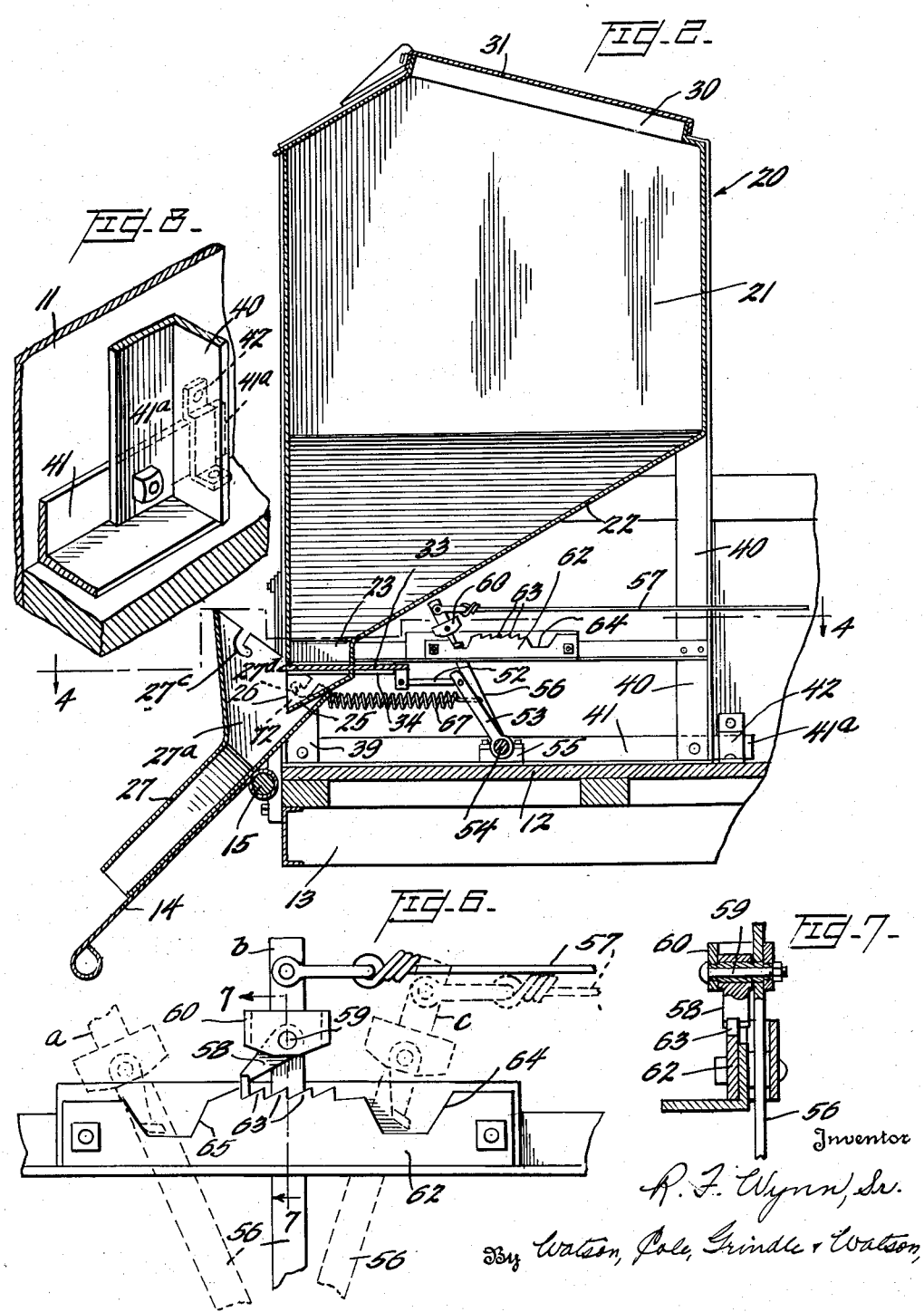

April 20, 1954   R. F. WYNN, SR   2,675,947
FEED DISTRIBUTING APPARATUS
Filed June 28, 1948   3 Sheets-Sheet 3
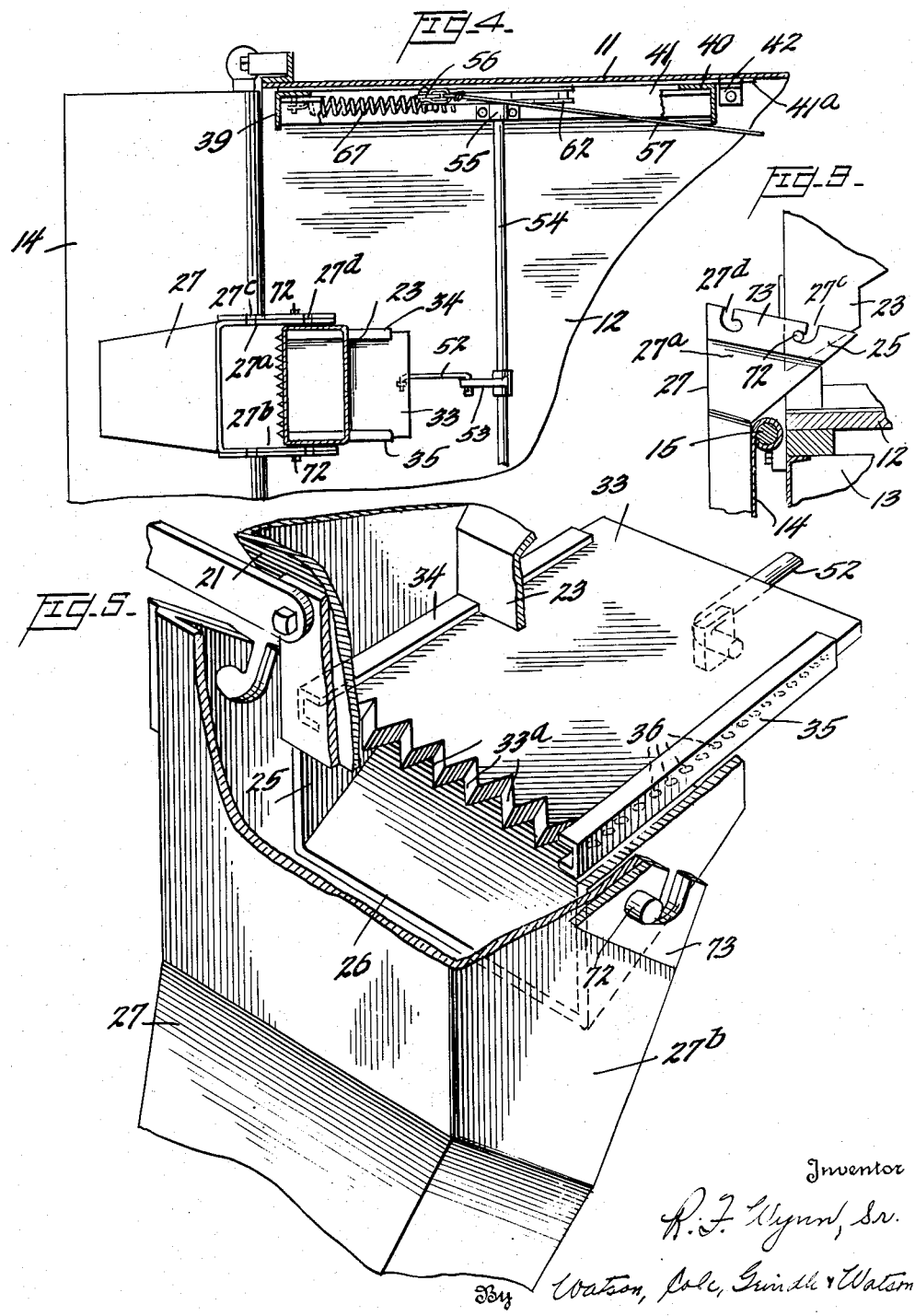

Patented Apr. 20, 1954

2,675,947

UNITED STATES PATENT OFFICE 2,675,947

FEED DISTRIBUTING APPARATUS

Robert Fred Wynn, Sr., Bellevue, Tex.; Ida Wynn, temporary administratrix of said Robert Fred Wynn, Sr., deceased Application June 28, 1948, Serial No. 35,642

3 Claims. (Cl. 222—505)

The present invention relates to apparatus for the distribution of granular, lump or pulverulent material over areas devoted to grazing or agriculture and comprises essentially a material storage bin or hopper, with means for bringing about the controlled delivery of material from the hopper, and a mobile support upon which the bin is detachably mounted.

More specifically stated the invention contemplates the utilization of a farm conveyance such as a truck which may be freely moved over pasture lands or plowed fields, and which is modified somewhat for the reception of a materials bin equipped with material discharge controlling means, the bin being designed and constructed in such manner as to be readily mounted upon and detachably secured to the vehicle. Thus the vehicle, if a truck, may be used for all purposes for which a truck may normally be employed but may readily be converted, by the mounting of the materials bin thereon, into a materials distributing apparatus. The means for securing the bin to the truck body is of novel character, enabling the attachment to be effected with minimum effort and the removal of the bin from the truck to be accomplished quickly, the bin being firmly held in position while mounted, however, despite movement of the vehicle over rough ground.

The means for permitting predetermined or controlled amounts of material to be discharged from the bin is of novel character, being thoroughly effective, of great simplicity, and readily operable from a distant point, as from the driver's seat of the vehicle, without difficulty.

One embodiment of the invention is illustrated in the accompanying drawings in which, Figure 1 shows in end elevation the rear end of a truck body and, in front elevation, the materials holding bin mounted upon the truck;

Figure 2 is a section on line 2—2 of Figure 1;

Figure 3 is a section on line 3—3 of Figure 1;

Figure 4 is a section on line 4—4 of Figure 2;

Figure 5 is a perspective view of portion of the means for controlling or regulating the discharge of material from the bin, the bin wall being broken away;

Figure 6 is a side elevation of portion of the material discharge control mechanism;

Figure 7 is a section on line 7—7 of Figure 6;

Figure 8 is a perspective view of a detail; and

Figure 9 is a section on line 9—9 of Figure 1 but showing the materials discharge spout in a different or reversed position.

The mobile support or vehicle upon which the materials bin is mounted may be a truck having an open body with parallel sides, such for instance as that partially illustrated in the drawings, the sides of the truck body being indicated at 10 and 11 respectively, the bottom or floor at 12, supporting frame at 13 and pivoted back wall or tail gate at 14, this tail gate being mounted for swinging movement upon the horizontal shaft 15 in customary manner. The bin or hopper is generally indicated at 20 and, in the form of the invention shown, comprises the bin proper 21, having vertical side walls and a hopper shaped bottom indicated generally at 22 comprising three inclined bottom plates extending downwardly from the side walls toward a port 23 through which the material to be dispensed will be allowed to descend in regulated amounts under control of the operator. Below discharge port 23 is an integral spout-like extension 25 for directing the falling material downwardly and outwardly through a vertical discharge port 26. Material passing through discharge port 26 will enter a material directing chute 27 and pass through the chute to the ground, the chute being either supported in the manner in which it is shown to be supported in Figure 2, for inclined discharge, or supported in the manner in which it is shown in Figure 9, for vertical discharge.

Material is introduced through an opening 30 in the top of the bin, this opening being normally closed by a hinged cover 31, and the discharge of the material through the discharge spout just described is controlled by means of a horizontally disposed sliding gate 33. This gate, which may be most clearly perceived in Figure 5, comprises essentially a rectangular plate having opposed parallel edges disposed between the upper and lower flanges of parallel supporting channel members 34 and 35. The lower flange of each of these channel members is provided with apertures 36 through which granular material may be forced by the slide when it tends to impede the movement of the slide, and the forward edge of the slide is beveled and provided with saw teeth or serrations 33a so that the slide may be forced forwardly despite the resistance of any material which may be at the time in the chute, to interrupt the flow of material. Guides 34 and 35 are rigidly attached to the sides of the spout.

The bin or hopper 21 is provided with four supporting legs which may conveniently be angle members such as indicated at 38, 39 and 40 at three of the corners of the bin and by a similar member (not illustrated) at the remaining corner. At their lower ends the four legs are connected together by horizontally extending structural members so that the frame comprises a rigid structural unit. It is detachably secured in position upon the truck body. Thus the corner of the frame at leg 40 is separably attached to the side wall of the truck body, the vertical flange of the angle member 41 having an extension 41a which is adapted to enter a correspondingly shaped recess defined by the strap 42 rigidly attached to the inner face of the side 11 of the truck body. By a horizontal or sliding movement the extension 41a may be withdrawn from the retaining strap and this extension may be as readily engaged with the retaining strap when the materials bin is again mounted upon the truck body.

The left rear corner is latched to the side wall 11 of the truck body by latching member 44 which may be horizontally reciprocated by means of a lever 45 pivoted at 46 upon a rigid cross brace 47. Latch 44 slidably rests upon a bracket 39a secured to the leg 39 and the outer end of the latch is provided with a laterally extending portion 47a and a terminal portion 47b parallel to the latch body. By reciprocating the latch in the direction of its length its terminal portion 47b may be caused to pass into aligned apertures formed in the side wall 11 of the truck body, the leg 39 of the hopper frame, and a reinforcing plate 50 attached to the truck side wall. When in the position in which it is shown in full lines in Figure 3 the latch 44 secures the hopper frame and hopper against movement relatively to the truck body. When moved to the position in which it is shown in dotted lines in Figure 3 the hopper frame is released by the latch and may be withdrawn by a lifting motion which frees the extension 41a of bracket 41 from the strap 42. A locking dog or detent 48, normally drawn downwardly onto the latch 44 by a spring 49, engages one or the other of the teeth 51 and holds the latch in locking relation to the side wall until lifted.

The sliding gate 33 may be moved into position to completely prevent the discharge of material through the opening in the bottom of the hopper, being shown in this position in Figure 2. Means is provided for actuating the gate member 33 under the control of the driver of the vehicle, such means permitting the operator to open the gate when material is to be discharged, close the gate when the flow of discharging material is to be interrupted and to lock the gate in partially open position if a continuous flow is desired, the gate actuating mechanism being operable from the driver's seat. It will be observed from an inspection of Figures 2 and 4 that the rear end of the gate is connected by means of a link 52 to the upper end of a lever 53 fixed upon a rock shaft 54, the rock shaft extending horizontally and having its ends rotatably mounted in bearings 55 mounted upon parallel horizontal structural members comprising portions of the frame. Also fixed upon rock shaft 54, at one end thereof, is a lever 56 the upper end of which is connected as by a cord 57 with an operating handle (not illustrated) conveniently located adjacent the seat normally occupied by the driver of the vehicle. Mounted upon lever 56 is a pawl 58, the pawl being supported for free swinging movement upon a sleeve which encircles a pivot 59 which passes through the lever 56, pivot 59 likewise serving to secure upon lever 56 a loop-like guard member 60 which prevents the pawl from being rotated about its axis through an angle greater than approximately 180°. The pawl may, therefore, not be accidentally thrown to inoperative position.

Positioned directly below the pawl and rigidly secured to the supporting frame of the feed hopper is a rack member 62 provided with a plurality of teeth 63 in a short series located centrally of member 62 and in position to be engaged by the pawl 58 when the lever 56 is in a substantially vertical position. The teeth 63 of the rack, and the free end of the pawl, are so designed that, when the lever 56 is drawn in a clockwise direction (Figure 6) the pawl will move freely over the rack but, if the movement of the lever 56 is halted while the pawl is in engagement with the rack, the lower end of the pawl will engage a tooth and prevent movement of the lever 56 in a counterclockwise direction. The rack member 62 is, at each end of the toothed central portion of the rack deeply cut away as at 64 and 65, each of these recesses being adapted to receive the pawl 58, as shown in Figure 6, when the lever 56 is at one end of its travel.

Normally lever 56 will be maintained in the position in which it is shown in Figure 2, a helical tension spring 67 one end of which is connected to the frame and the other end of which is connected to the lever 56 normally acting to draw the lever to the left and thus maintain the gate 33 in closed position. The operator of the vehicle may at any time, by tensioning the cord 57, rock lever 56 by pulling the cord 57, moving the lever, for instance, from its normal position, i. e. position a of Figure 6, through a mid-position, position b, in which position of the lever the gate will be partially open, to a position such as indicated at c in Figure 6, in which position the gate will have been withdrawn from the aperture at the bottom of the bin to permit free flow of material to the discharge orifice 26. On release of cord 57 spring 67 will automatically act to return the lever 56 to its initial position a, the pawl 58 riding idly over the teeth 63 of the rack due to the fact that its angular position with respect to the lever 56 upon which it is mounted has changed, the pawl end having disengaged the rack and descended into the recess 64 at the end of the stroke of the lever so that, when the lever moves on its returning movement the pawl will simply trail after the lever. When the lever reaches its initial position a the pawl will descend into recess 65 and hence, when the lever is again drawn forward by the cord 57 the pawl will, when drawn over the rack, be in position to operatively engage one or the other of teeth 63 and the lever 56 can be halted and locked in mid-position with the gate 33 in an intermediate or partially open position.

The operator may thus intermittently discharge material from time to time as he thinks necessary, by pulling and then releasing cord 57, or may adjust the gate 33 so that there is a constant discharge at a chosen rate. Where the device is employed in the feeding of lump cottonseed cake to cattle, which is a use for which it is particularly adapted, a single, practically continuous forward movement of the lever 56 will result in the discharge of a desired amount of cake onto the surface of a pasture, this operation being repeated from time to time as required, depending upon the speed of the vehicle and the number of cattle to be fed.

It may be desired to discharge the material downwardly at an incline over the rear end of the vehicle body or vertically downwardly and, in order to make it possible for the operator to conveniently arrange for vertical or inclined discharge, a discharge chute 27 of novel character is provided. This chute comprises a tubular lower portion which merges at its upper end with a downwardly tapering funnel-like portion having parallel side walls 27a and 27b. Each such side wall is provided with two spaced slots the slots formed in side wall 27a being indicated at 27c and 27d, respectively, and each such slot having a portion disposed longitudinally of the direction in which the chute extends and an inwardly extending terminal portion. Secured upon the outer surfaces of the side walls of hopper 25 are outwardly extending aligned pins 72 respectively, these pins comprising chute supporting pins and being adapted to enter, respectively, the corresponding slots of each pair of pin receiving slots of the chute. Thus, by manipulating the chute so as to cause pins 72 to enter slots 27d, the chute 27 may be locked in an inclined position as shown in Figure 2, its lower end resting upon the lower surface of the tail gate 14 of the vehicle body. If the material is to be discharged vertically downward the chute is reversed and pins 72 are caused to enter slots 27c, as shown in Figure 9, tail gate 14 being dropped into vertical position. If desired reinforcing members or plates such as indicated at 73 may be attached to the upper end of the chute 27 to reinforce the margins of the chute side walls 27a and 27b, the member 73 being correspondingly slotted as shown in Figure 5 to receive the pins 72.

It will be appreciated that minor changes in design and arrangement of the various elements of the invention may be effected in order to adapt the invention to the feeding of materials of differing characteristics.

The feed distributing apparatus which comprises the subject matter of this invention may conveniently be fabricated of iron or steel sheets and structural shapes, secured together by welding, riveting or by bolts or screws. Within the import of the invention, however, the materials used in the fabrication of the apparatus may be varied widely, likewise the methods or means for securing the respective elements of the apparatus in fixed relationship.

Having thus described the invention, what is claimed as new and desired to be secured by Letters Patent is:

1. A feed distributing mechanism comprising a hopper having a material discharge port in its bottom, a gate movable into and out of said port, for controlling the movement of material out of the hopper, and means for actuating said gate, said means including, a lever, means connecting the lever and gate, a rack, and a pawl pivotally mounted on the lever and adapted to rest upon and be drawn over the teeth of the rack when the lever is moved in one direction and to engage a rack tooth when the movement of the lever is interrupted at an intermediate point, the arrangement being such that the pawl falls to vertical position and completely disengages the rack at the end of forward movement of the lever and trails behind the lever so as to be inoperative when the lever is moved on its return stroke.

2. The combination set forth in claim 1 in which a stop member is mounted on the lever to limit the swinging movement of the pawl.

3. A feed distributing mechanism comprising a hopper having a discharge orifice, a sliding gate for controlling the flow of material through said orifice, said gate having parallel edges extending parallel to the direction of sliding movement, means for sliding said gate, and gate edge supporting members channel shaped in cross section, the webs of said channel shaped supporting members being perforated to permit the escape of granular material.

References Cited in the file of this patent

UNITED STATES PATENTS

| Number | Name | Date |
| --- | --- | --- |
| 292,893 | Carr | Feb. 5, 1884 |
| 307,610 | Whitman | Nov. 4, 1884 |
| 331,600 | Ziegler et al. | Dec. 1, 1885 |
| 373,585 | Ellwood et al. | Nov. 22, 1887 |
| 388,641 | Dable | Aug. 28, 1888 |
| 435,465 | Taylor | Sept. 2, 1890 |
| 493,146 | Bender | Mar. 7, 1893 |
| 655,397 | Fitzgerald et al. | Aug. 7, 1900 |
| 707,767 | Ferrari | Aug. 26, 1902 |
| 724,346 | Smith | Mar. 31, 1903 |
| 912,431 | Smith | Feb. 16, 1909 |
| 928,858 | Doud | July 20, 1909 |
| 981,136 | Stubbs | Jan. 10, 1911 |
| 987,388 | Marsh | Mar. 21, 1911 |
| 1,072,823 | Cherry | Sept. 9, 1913 |
| 1,172,005 | Butterfield | Feb. 15, 1916 |
| 1,179,866 | Rieske | Apr. 18, 1916 |
| 1,222,868 | Holland | Apr. 17, 1917 |
| 1,312,642 | Niemann | Aug. 12, 1919 |
| 1,373,521 | Neller | Apr. 5, 1921 |
| 1,602,146 | Callison | Oct. 5, 1926 |
| 1,655,533 | Campagna | Jan. 10, 1928 |
| 1,667,568 | Somogyi | Apr. 24, 1928 |
| 1,863,028 | Pardee, Jr. | June 4, 1932 |
| 1,881,003 | Wallace | Oct. 4, 1932 |
| 2,044,592 | Richards | June 6, 1936 |
| 2,304,622 | Barrett | Dec. 8, 1942 |
| 2,307,172 | Vanhooser | Jan. 5, 1943 |
| 2,351,314 | Ario | June 13, 1944 |
| 2,490,241 | Smith et al. | Dec. 6, 1949 |
| 2,550,303 | Simpson | Apr. 24, 1951 |
| 2,557,704 | Stevens | June 19, 1951 |

FOREIGN PATENTS

| Number | Country | Date |
| --- | --- | --- |
| 203,871 | Great Britain | Sept. 20, 1923 |